US009645478B2

(12) United States Patent
Mikawa et al.

(10) Patent No.: US 9,645,478 B2
(45) Date of Patent: May 9, 2017

(54) COOLING DEVICE, IMAGE PROJECTION APPARATUS, AND ELECTRONIC APPARATUS (71) Applicants: Akihisa Mikawa, Kanagawa (JP); Tetsuya Fujioka, Kanagawa (JP); Hideo Kanai, Tokyo (JP); Masamichi Yamada, Kanagawa (JP); Yasunari Mikutsu, Tokyo (JP); Satoshi Tsuchiya, Kanagawa (JP); Naoyuki Ishikawa, Kanagawa (JP)

(72) Inventors: Akihisa Mikawa, Kanagawa (JP); Tetsuya Fujioka, Kanagawa (JP); Hideo Kanai, Tokyo (JP); Masamichi Yamada, Kanagawa (JP); Yasunari Mikutsu, Tokyo (JP); Satoshi Tsuchiya, Kanagawa (JP); Naoyuki Ishikawa, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 37 days.

(21) Appl. No.: 14/305,343

(22) Filed: Jun. 16, 2014

(65) Prior Publication Data
US 2014/0375966 A1 Dec. 25, 2014

(30) Foreign Application Priority Data
Jun. 21, 2013 (JP) .................. 2013-131180

(51) Int. Cl.
G03B 21/16 (2006.01)
H04N 9/31 (2006.01)
(52) U.S. Cl.
CPC .......... G03B 21/16 (2013.01); H04N 9/3144 (2013.01)

(58) Field of Classification Search
CPC ...... G03B 21/16; G03B 21/14; G03B 21/145; H04N 9/3144; H04N 9/3141
(Continued)

(56) References Cited

U.S. PATENT DOCUMENTS 7,149,041 B2 * 12/2006 Hsu .................. G02B 7/181
348/E5.142
7,405,932 B2 * 7/2008 Vinson ............... H05K 7/20727
165/80.3

(Continued)

FOREIGN PATENT DOCUMENTS

JP 11-340669 12/1999
JP 2000-269674 9/2000
(Continued)

OTHER PUBLICATIONS

U.S. Appl. No. 14/305,231, filed Jun. 16, 2014, Mikawa, et al.
(Continued)

Primary Examiner — William C Dowling
Assistant Examiner — Ryan Howard
(74) Attorney, Agent, or Firm — Oblon, McClelland, Maier & Neustadt, L.L.P.

(57) ABSTRACT

A cooling device includes a heat dissipating unit that is in contact with an object to be cooled and dissipates heat, and an air blowing unit that takes therein air and blows the air to the heat dissipating unit. The heat dissipating unit includes a first stage portion and a second stage portion that have a difference in level therebetween. The air blowing unit includes a first inlet port that takes therein air from outside, and an outlet port that exhausts the taken-in air. The first inlet port faces the first stage portion, and the outlet port faces the second stage portion.

6 Claims, 11 Drawing Sheets (58) Field of Classification Search
USPC .......... 353/57, 58, 60, 61, 52, 119; 361/676, 361/677, 678, 679.46–679.54
See application file for complete search history.

(56) References Cited

U.S. PATENT DOCUMENTS

| | | |
|---|---|---|
| 2008/0019827 A1 | 1/2008 | Hirata |
| 2008/0055563 A1* | 3/2008 | Momose ................ G03B 21/16 353/61 |
| 2009/0290131 A1* | 11/2009 | Kim ....................... G03B 21/16 353/61 |
| 2013/0114045 A1 | 5/2013 | Fujioka et al. |
| 2013/0114054 A1 | 5/2013 | Ishikawa et al. |

FOREIGN PATENT DOCUMENTS

| | | |
|---|---|---|
| JP | 2001-119183 | 4/2001 |
| JP | 2001119183 A * | 4/2001 |
| JP | 2001-210765 | 8/2001 |
| JP | 2005-321287 | 11/2005 |
| JP | 2008-291819 | 12/2008 |
| JP | 2012-069301 | 4/2012 |
| JP | 2013-097340 | 5/2013 |
| JP | 2013-097342 | 5/2013 |

OTHER PUBLICATIONS

U.S. Appl. No. 14/305,231, filed Jun. 16, 2014.
Office Action issued in Japanese Patent Application No. 2013-242205 mailed Dec. 17, 2013.
Office Action issued in Japanese Patent Application No. 2013-242205 mailed Mar. 4, 2014.

* cited by examiner

COOLING DEVICE, IMAGE PROJECTION APPARATUS, AND ELECTRONIC APPARATUS

CROSS-REFERENCE TO RELATED APPLICATIONS

The present application claims priority to and incorporates by reference the entire contents of Japanese Patent Application No. 2013-131180 filed in Japan on Jun. 21, 2013.

BACKGROUND OF THE INVENTION

1. Field of the Invention

The present invention relates to a cooling device, an image projection apparatus, and an electronic apparatus.

2. Description of the Related Art

As a method of cooling a heat source, as disclosed for example in Japanese Patent Application Laid-open No. 2001-210766 and Japanese Patent Application Laid-open No. 2000-269674, there is a known method of pressing a heat dissipation plate against the heat source to enlarge a heat dissipation area and blowing cooling air to an enlarged heat dissipation portion. Furthermore, as a method of enhancing cooling efficiency, for example, a method of molding a heat dissipation plate with a material having high thermal conductivity is implemented. By molding the heat dissipation plate with the material having high thermal conductivity, the heat transmitted from a contact portion with the heat source can be uniformly spread over the entire heat dissipation plate. This results in an increase in the heat dissipation area, which enables the heat source to be effectively cooled.

It is also effective to increase a contact area between cooling air and a heat dissipation plate, as disclosed for example in Japanese Patent Application Laid-open No. 2001-210766 and Japanese Patent Application Laid-open No. 2000-269674. The heat dissipation plate heated by receiving heat from a heat source is cooled in a contact portion with the cooling air. Therefore, by enlarging the contact area with the cooling air, cooling efficiency can be enhanced. As a method of enlarging the contact area, a method of attaching fins to the heat dissipation plate is already known. By attaching the fins to the heat dissipation plate with a fine pitch and blowing the cooling air to spaces between pitches, the contact area with the cooling air can be enlarged, thus enhancing the cooling efficiency.

Moreover, a forced air cooling system for cooling a heat dissipation plate using a fan is adopted as disclosed for example in Japanese Patent Application Laid-open No. 2001-210766 and Japanese Patent Application Laid-open No. 2000-269674. The cooling capacity depends on wind speed of air passing through pitches of fins. Therefore, to enhance the cooling capacity, the wind speed of the air passing through the pitches needs to be increased, and because of this, the forced air cooling can obtain higher cooling effect than that of natural air cooling. A method of using a fan is common as the forced air cooling. Particularly, a cooling structure can be said common, in which an outlet port of a sirocco fan with high static pressure is disposed so as to face rectangular fins and to blow air discharged from the sirocco fan directly to the fins.

However, the conventional cooling method has a problem that when cooling efficiency is to be structurally enhanced, the structure is upsized caused by increasing the surface area of the heat dissipation plate and caused by requiring a larger more powerful fan in order to improve the cooling efficiency. Therefore, in either case, the structure is increased in size and weight, and therefore there remains a problem that it is difficult to store such a structure in a compact and lightweight electric apparatus.

In view of the conventional problems, there is a need to provide a cooling device capable of efficiently cooling an object to be cooled while downsizing the cooling device.

SUMMARY OF THE INVENTION

It is an object of the present invention to at least partially solve the problems in the conventional technology.

According to the present invention, there is provided a cooling device including a heat dissipating unit that is in contact with an object to be cooled and dissipates heat, and an air blowing unit that takes therein air and blows the air to the heat dissipating unit, wherein the heat dissipating unit includes: a first stage portion and a second stage portion that have a difference in level therebetween, and the air blowing unit includes: a first inlet port that takes therein air from outside; and an outlet port that exhausts the taken-in air, wherein the first inlet port faces the first stage portion, and the outlet port faces the second stage portion.

The present invention also provides an image projection apparatus including an image processing unit, and a cooling device that cools the image processing unit, wherein the cooling device includes: a heat dissipating unit that is in contact with an object to be cooled and dissipates heat; and an air blowing unit that takes therein air and blows the air to the heat dissipating unit, wherein the heat dissipating unit includes: a first stage portion and a second stage portion that have a difference in level therebetween, and the air blowing unit includes: a first inlet port that takes therein air from outside; and an outlet port that exhausts the taken-in air, the first inlet port faces the first stage portion, and the outlet port faces the second stage portion.

The present invention also provides an electronic apparatus including a device as an object to be cooled, and a cooling device that cools the device, wherein the cooling device includes: a heat dissipating unit that is in contact with the object to be cooled and dissipates heat; and an air blowing unit that takes therein air and blows the air to the heat dissipating unit, wherein the heat dissipating unit includes: a first stage portion and a second stage portion that have a difference in level therebetween, and the air blowing unit includes: a first inlet port that takes therein air from outside; and an outlet port that exhausts the taken-in air, the first inlet port faces the first stage portion, and the outlet port faces the second stage portion.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained below with reference to the accompanying drawings.

First Embodiment

Figure 1:
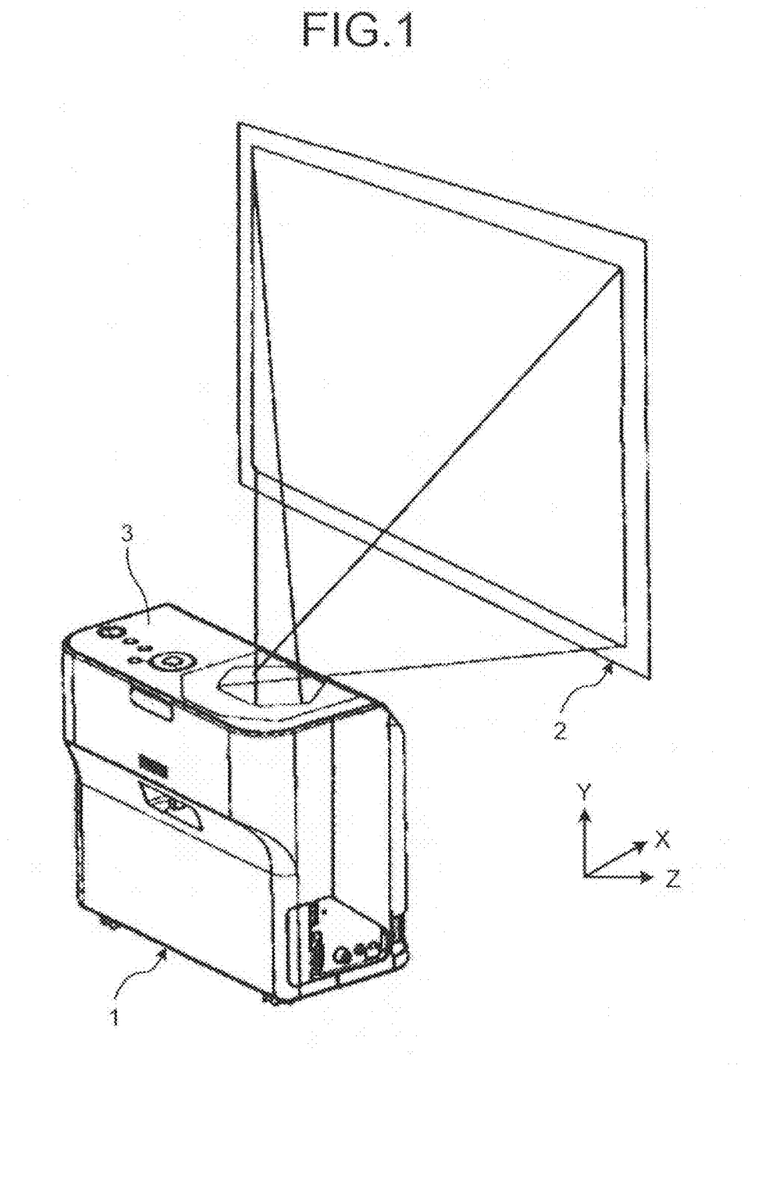
FIG. 1 is a perspective view illustrating a usage mode of an image projection apparatus according to a first embodiment of the present invention.

FIG. 1 is an external perspective view of an image projection apparatus 1 according to a first embodiment when viewed obliquely. The image projection apparatus 1 generates a video image based on video data input from a personal computer or a video camera or the like, and projects and displays the video image on a screen 2 or the like. For a liquid crystal projector widely known as the image projection apparatus 1, high resolution of a liquid crystal panel, improvement of brightness due to higher efficiency of a light source lamp, cost reduction, and the like have been progressing in recent years. Moreover, compact and lightweight image projection apparatuses using a digital micro-mirror device (DMD) have become popular, and these image projection apparatuses have been widely used not only in offices and schools but also at home. Particularly, the portability of front-type projectors has been improved, so that the projectors are used also in small meetings.

Figure 2:
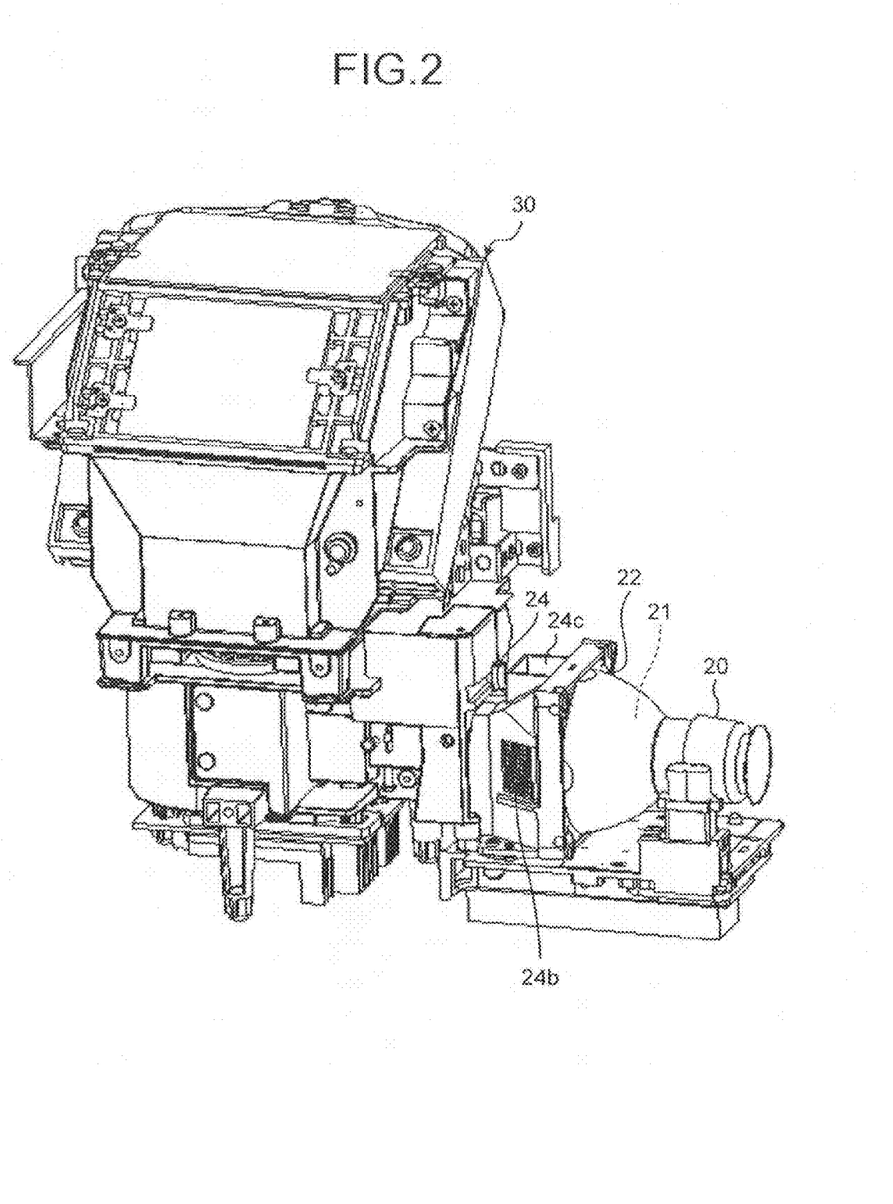
FIG. 2 is a perspective view illustrating an optical engine unit and a light source device according to the first embodiment.

FIG. 2 is a perspective view of the image projection apparatus 1 in FIG. 1 when an external cover 3 is removed therefrom. As illustrated in FIG. 2, the image projection apparatus 1 includes an optical engine unit 30 and a light source device 20. The light source device 20 controls a light source such as a high-pressure mercury lamp to supply white light required for projection of an image to the optical engine unit 30.

The light source device 20 has a light source bracket 22 being a holding member for holding a light source 21, and mounts the light source 21 such as a halogen lamp, metal halide lamp, or a high-pressure mercury lamp on an upper side of the light source bracket 22.

A holder 24 in which a reflector (not illustrated) is held is screwed into a light emission side of the light source 21 on the upper side of the light source bracket 22. A light emission window 23 (see FIG. 3) is disposed on a face opposite to the side where the light source 21 of the holder 24 is provided. The light emitted from the light source 21 is converged on the light emission window 23 by the reflector, not illustrated, held by the holder 24, and is emitted from the light emission window 23.

Figure 3:
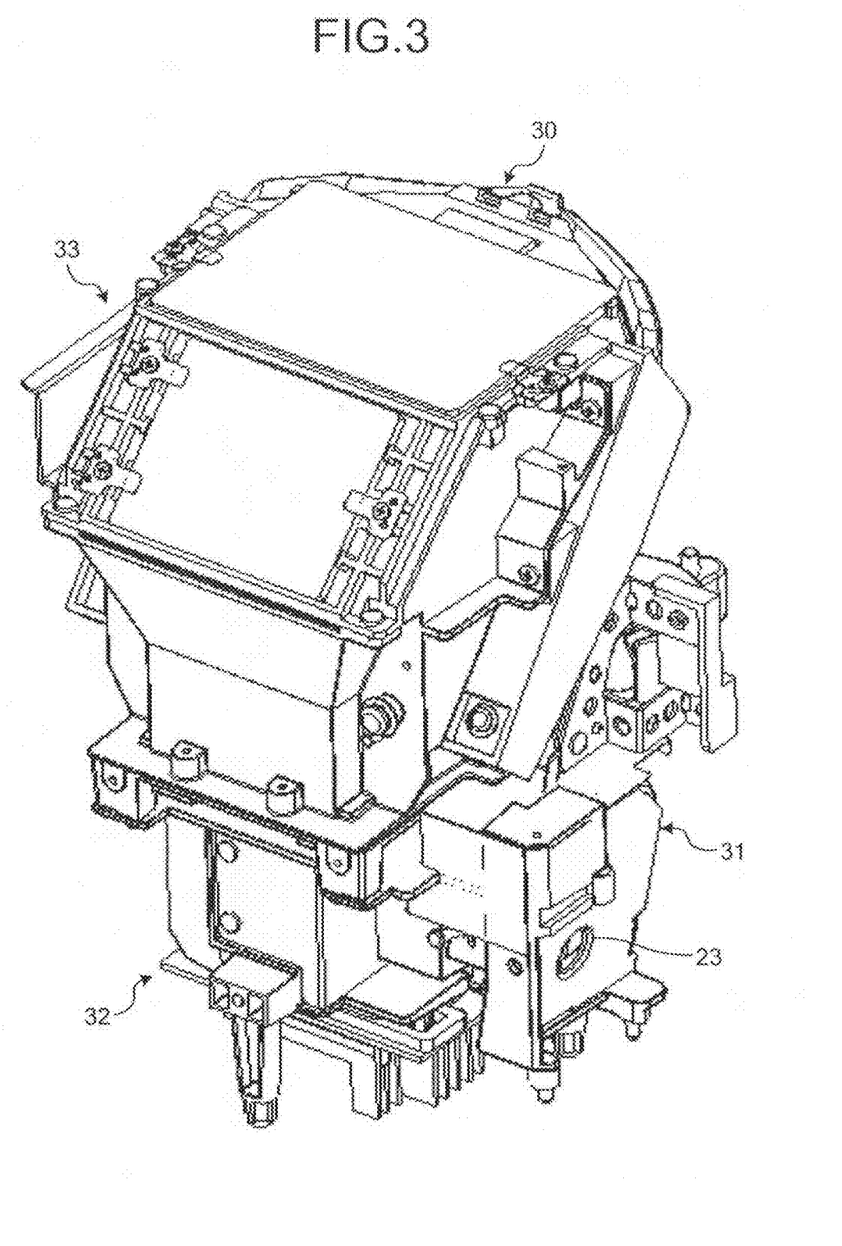
FIG. 3 is a perspective view illustrating the optical engine unit according to the first embodiment.

A light-source air supply port 24b through which air for cooling the light source 21 flows in is provided on a side face of the holder 24, and a light-source exhaust port 24c through which air heated by the heat of the light source 21 is exhausted is provided on the upper surface of the holder 24.

The optical engine unit 30 controls so as to use the light supplied from the light source device 20 and to process input image data to be projected. FIG. 3 is a perspective view of a detailed configuration of the optical engine unit 30. The optical engine unit 30 includes an illumination optical unit 31, a projection optical unit 33, and an image processing unit 32. The white light emitted from the light source device 20 is first irradiated to the illumination optical unit 31. The illumination optical unit 31 splits the white light emitted from the light source device 20 into components of red, green, and blue (RGB), and guides the lights to the image processing unit 32. The image processing unit 32 forms an image according to a modulation signal. The projection optical unit 33 enlarges and projects the image formed by the image processing unit 32.

Figure 4:
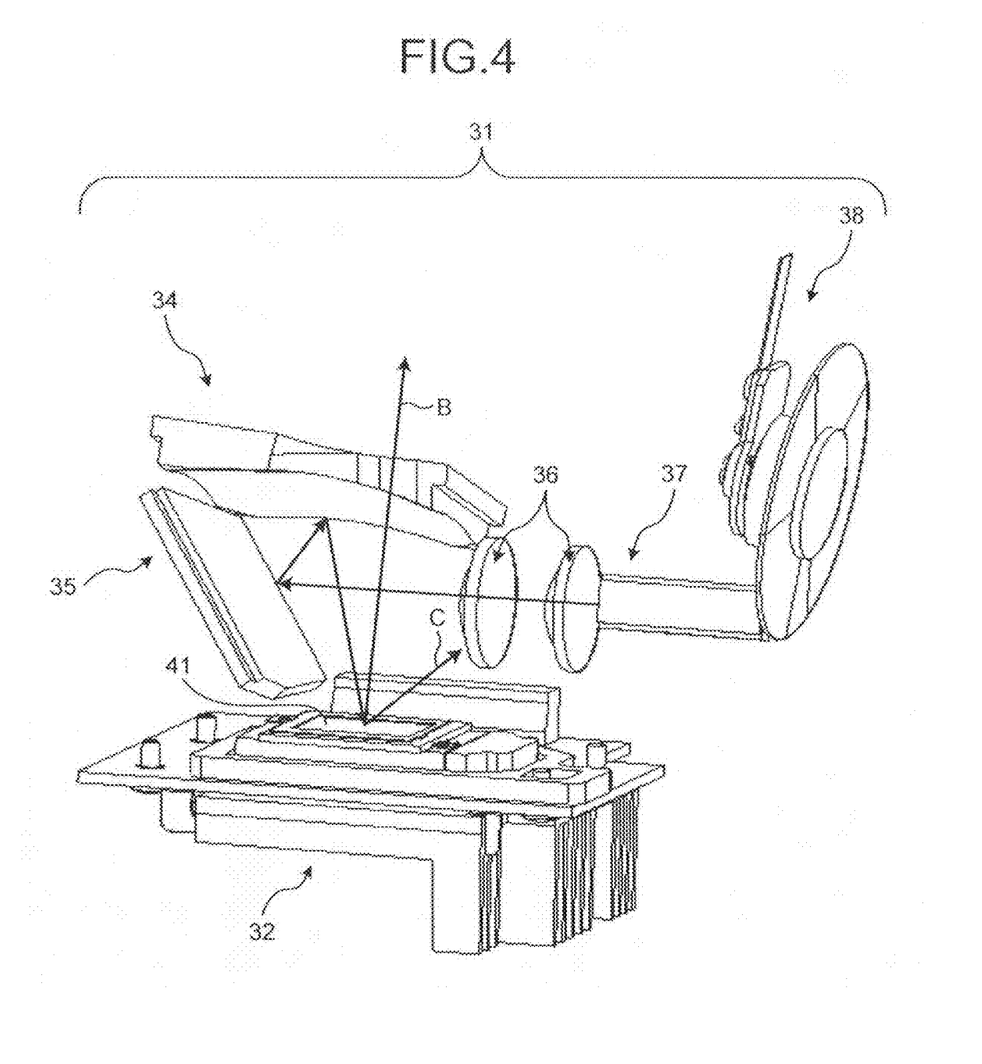
FIG. 4 is a perspective view illustrating an illumination optical unit and an image processing unit according to the first embodiment.

FIG. 4 is a configuration diagram of an arrangement of the illumination optical unit 31 and the image processing unit 32. The illumination optical unit 31 includes a color wheel 38, a light tunnel 37, a relay lens 36, a cylinder mirror 35, and a convex mirror 34. The color wheel 38 uses a disk-shaped color filter to convert the white light emitted from the light source device 20 into color light such that each of the colors of the RGB is repeated for each unit time, and emits the light. The light tunnel 37 is formed in a tubular shape by bonding a plate glass to be used for guiding the light emitted from the color wheel 38. The relay lens 36 is formed by combining two lenses and converges light emitted from the light tunnel 37 while correcting axial chromatic aberration of the light.

The cylinder mirror 35 and the convex mirror 34 reflect the light emitted from the relay lens 36. The reflected light enters the image processing unit 32. The image processing unit 32 includes a DMD element 41 that has a substantially rectangular mirror face formed from a plurality of micro-mirrors and processes a projection light to reflect so as to form a predetermined image by driving each of the micro-mirrors in a time division manner based on the image data. In the image processing unit 32, the light used by the micro-mirrors based on the video data obtained by time division using the DMD element 41 is reflected onto a projection lens 51 (FIG. 6) indicated by arrow B in FIG. 4, and light to be discarded is reflected onto an OFF light plate 53 (FIG. 6) indicated by arrow C.

Figure 5:
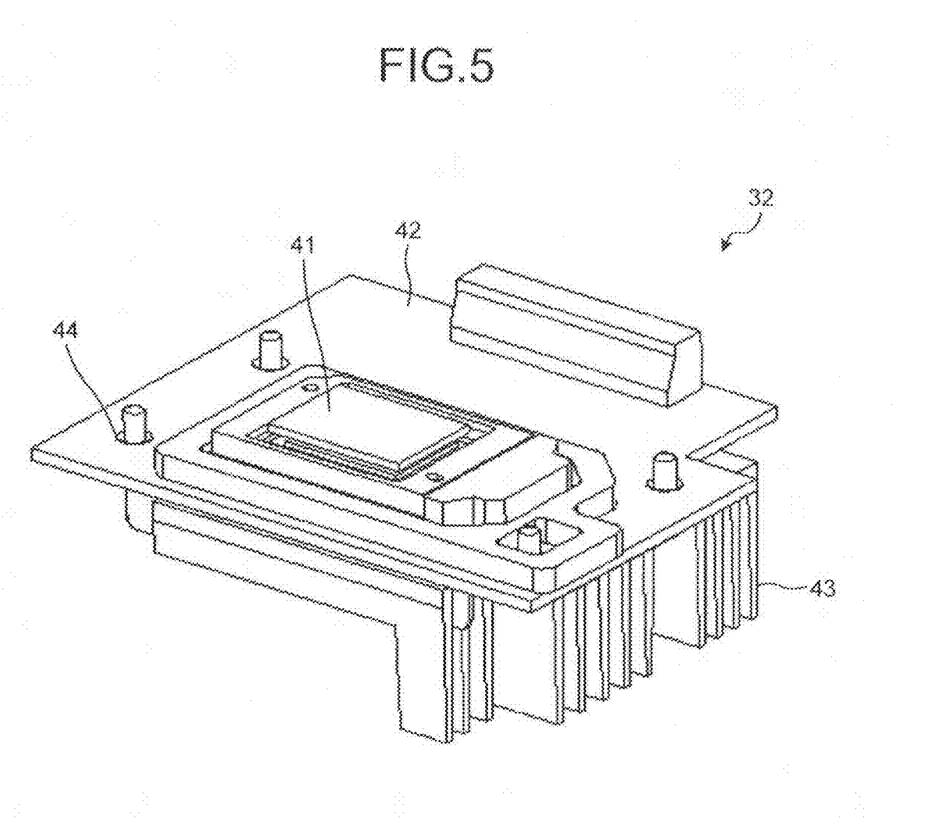
FIG. 5 is a perspective view illustrating the image processing unit according to the first embodiment.
Figure 6:
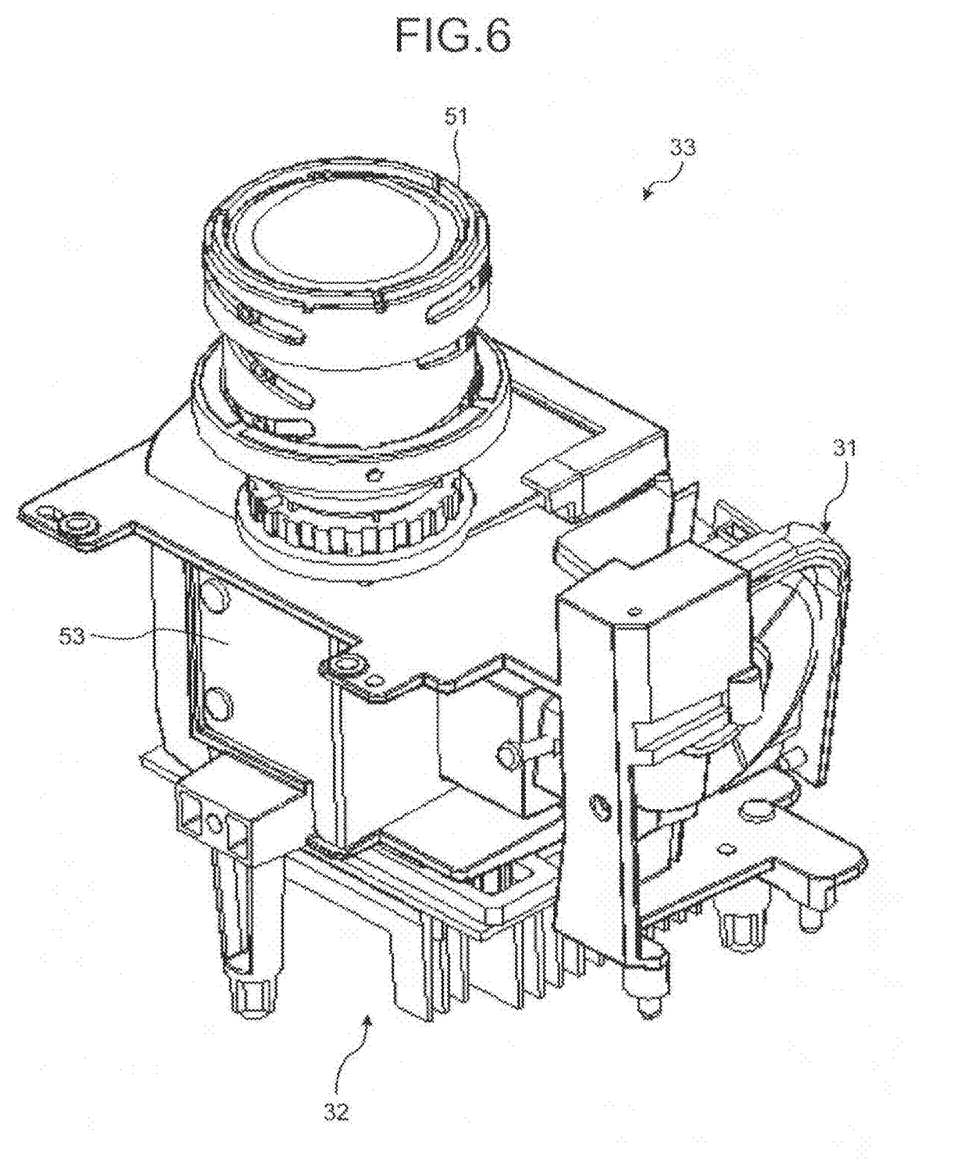
FIG. 6 is a perspective view illustrating a projection optical unit according to the first embodiment.

FIG. 5 is a perspective view of a configuration of the image processing unit 32. The image processing unit 32 includes a DMD element 41, a DMD printed circuit board 42 for controlling the DMD element 41, a heat sink 43 for cooling the DMD element 41, and a clamping plate 44 for pressing the heat sink 43 against the DMD element 41. In the present embodiment, the heat sink 43 corresponds to a heat dissipation unit. The heat sink 43 is in contact with the DMD element 41 as an object to be cooled to dissipate heat of the DMD element 41. FIG. 6 is a perspective view of a detailed configuration of the projection optical unit 33. The light having passed through the image processing unit 32 is reflected onto the projection lens 51, and light to be discarded is reflected onto the OFF light plate 53.

Figure 7:
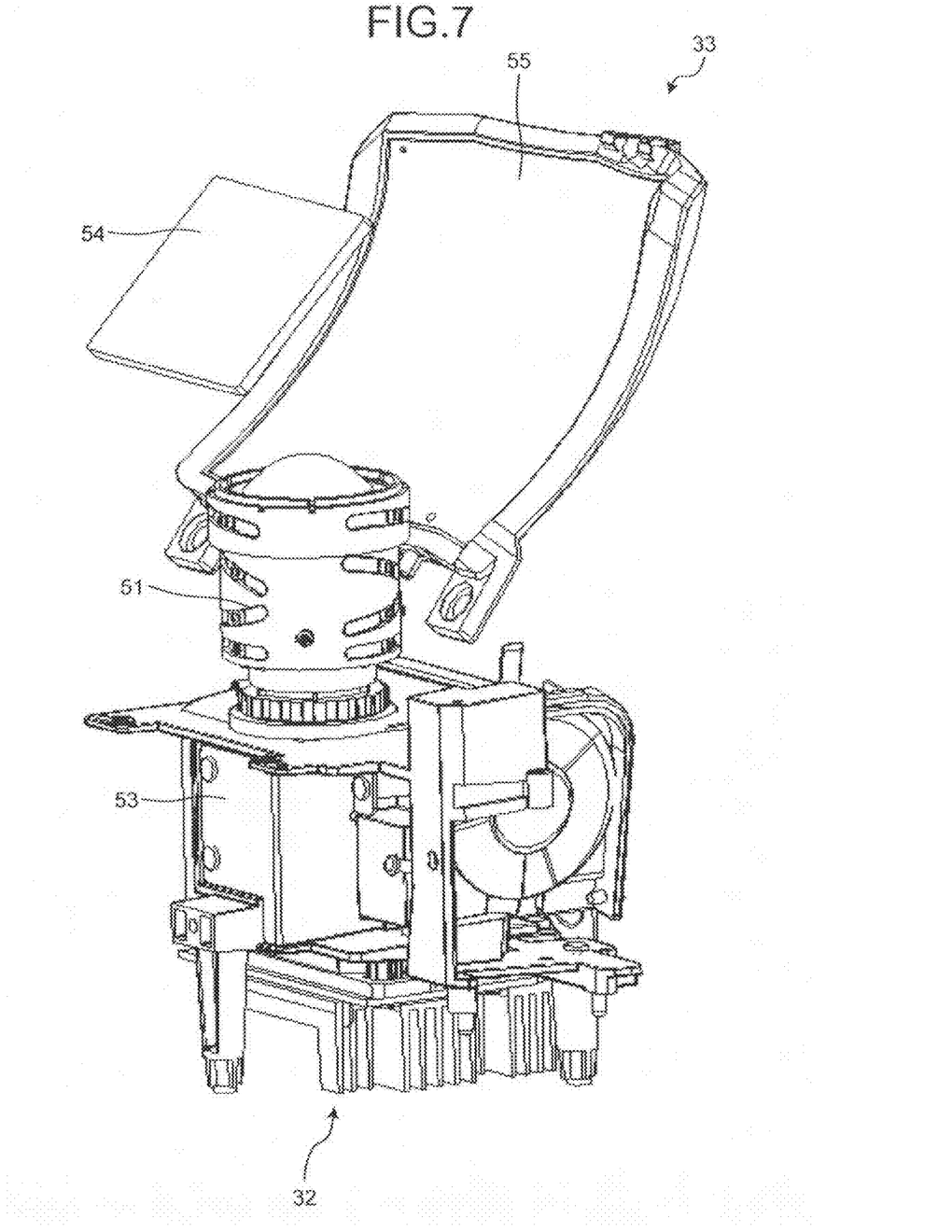
FIG. 7 is a perspective view illustrating the projection optical unit according to the first embodiment.
Figure 8:
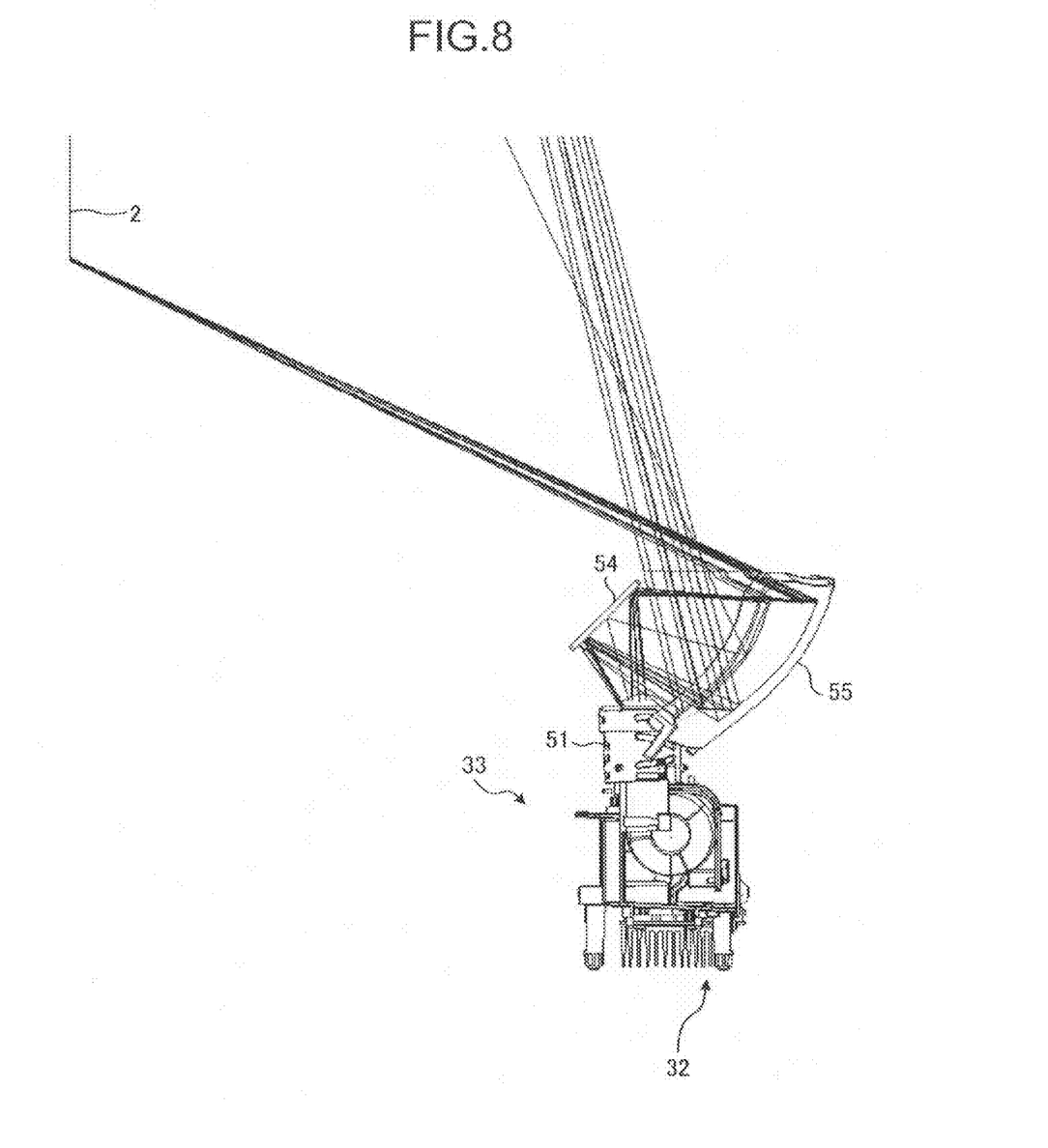
FIG. 8 is a side view illustrating the projection optical unit according to the first embodiment.

FIG. 7 and FIG. 8 are a perspective view and a side view of a configuration of the projection optical unit 33 respectively. A light path of video image light having passed through the projection lens 51 to be enlarged is reflected by a reflecting mirror 54 and the enlarged video image light is projected by a free-curved surface mirror 55 onto the screen 2. With the configuration, it is possible to design so that the optical engine unit 30 can be disposed close to the screen 2 and the projection optical unit 33 is thereby made vertical with a small installation area and three-dimensionally compact.

Figure 9A:
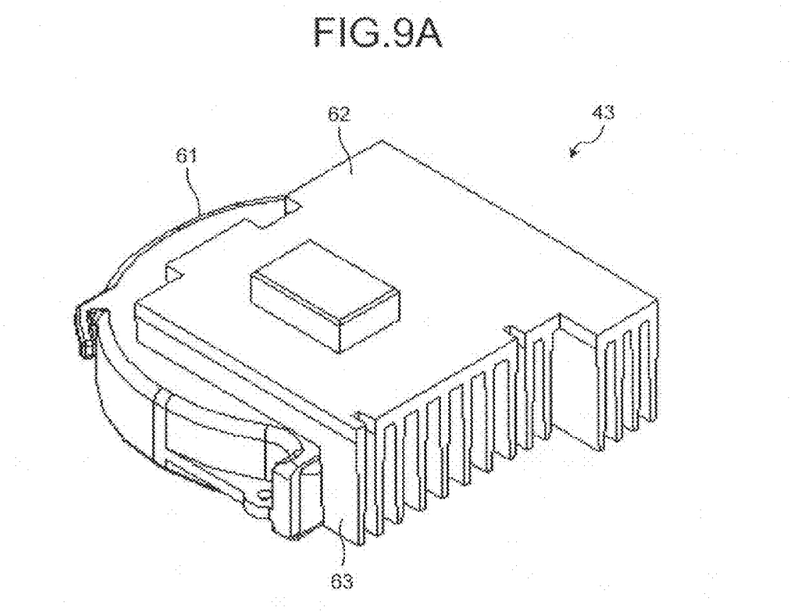
FIG. 9A is a perspective view illustrating a heat sink according to the first embodiment.
Figure 9B:
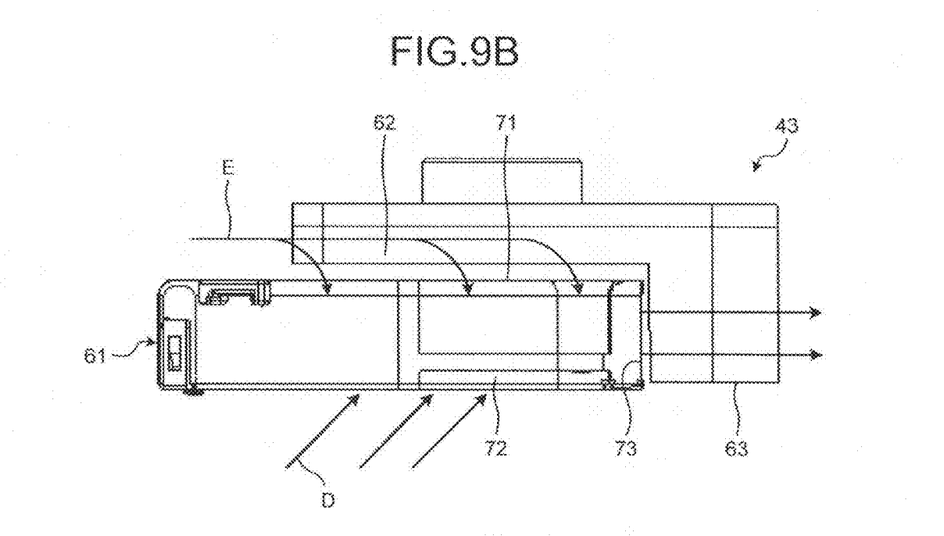
FIG. 9B is a side view illustrating the heat sink according to the first embodiment.
Figure 10:
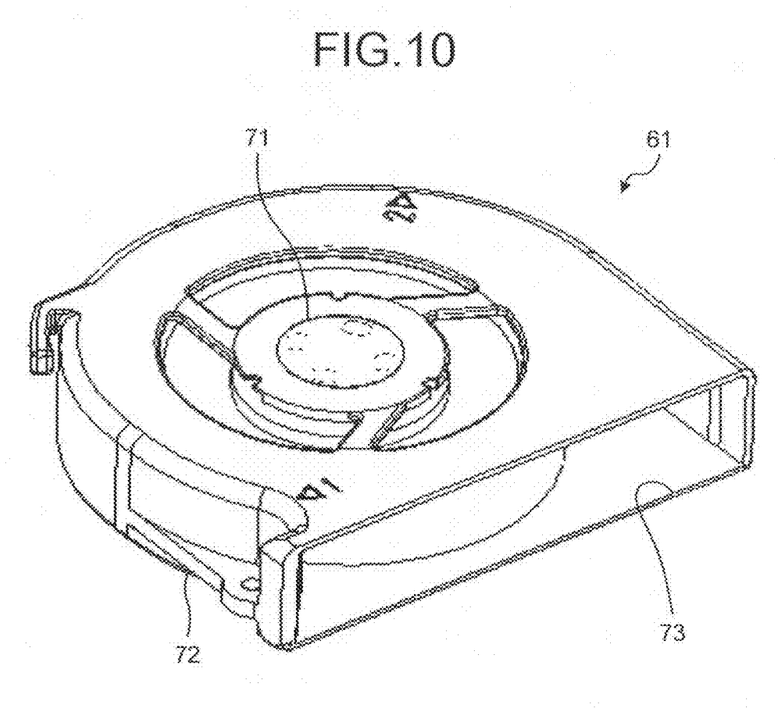
FIG. 10 is a side view illustrating a sirocco fan according to the first embodiment.

FIG. 9A and FIG. 9B are diagrams of a configuration of the heat sink 43 used in the present embodiment. The heat sink 43 has a two-stage configuration having a first stage portion 62 and a second stage portion 63 that have a difference in level therebetween. The second stage portion 63 is located in a lower position than the first stage portion 62 in the device. However, a positional relation between the first stage portion 62 and the second stage portion 63 changes depending on how the heat sink 43 is disposed in the image projection apparatus 1. Therefore, one of the two portions may be located in a higher position or both of them may be arranged in a horizontal direction; however, even in these cases, all the cases are regarded as those that have a difference in level. The second stage portion 63 is formed so that its bottom area is smaller than that of the first stage portion 62, and there is a difference in level between the second stage portion 63 and the first stage portion 62. The bottom area is an area defined when a surface in a direction perpendicular to a direction of the difference between the first stage portion 62 and the second stage portion 63 is set as a bottom surface. The heat sink 43 is provided with a sirocco fan 61 which is disposed in the difference. The sirocco fan 61 corresponds to an air blowing unit that takes therein air and blows the air to the heat sink 43. The sirocco fan 61 has a structure such that a tube having a number of compact forward curved vanes is combined with an air regulating unit, and a normal type with a static pressure efficiency of about 60% is used. As illustrated in FIG. 10, the sirocco fan 61 includes a first inlet port 71, a second inlet port 72, and an outlet port 73. The second inlet port 72 is provided in an opposite face side of the first inlet port 71, and the sirocco fan 61 is a fan of a double-sided inlet type. The outlet port 73 exhausts the air taken in by the sirocco fan 61. That is, in the present embodiment, the first inlet port 71 is provided on a top face side of the sirocco fan 61 and the second inlet port 72 is provided on a bottom face side of the sirocco fan 61.

As illustrated in FIG. 9B, a part of the first inlet port 71 of the sirocco fan 61 faces the first stage portion 62 of the heat sink 43, and the outlet port 73 of the sirocco fan 61 faces the second stage portion 63 of the heat sink 43. In this case, the second inlet port 72 of the sirocco fan 61 is preferably configured to face an air intake port provided in a housing and to take therein cooling air from the outside of the housing.

Based on the configuration as explained above, as indicated by arrow E, when the air for cooling is taken in from the first inlet port 71 side that faces the first stage portion 62 of the heat sink 43, the cooling air also passes through the fins of the heat sink 43, and the heat sink 43 can thereby be cooled. At this time, the cooling air draws the heat from the heat sink 43 in the air inlet side, and it is thereby expected that the temperature of the cooling air on the outlet side is thereby increased as compared with the cooling side. However, if the temperature of the cooling air on the outlet side is lower as compared with that of the heat sink 43, the heat sink 43 can be cooled. Moreover, the sirocco fan 61 has the second inlet port 72, and therefore fresh air outside the housing can be taken in from the second inlet port 72 as indicated by arrow D. Therefore, even if the temperature of the cooling air taken in from the first inlet port 71 that faces the first stage portion 62 of the heat sink 43 slightly increases with cooling of the heat sink 43, it is quite possible to cool the second stage portion 63 of the heat sink 43 that faces the outlet port 73.

On the other hand, in the case of the conventional configuration, the heat sink 43 is disposed so as to face the outlet port 73 of the sirocco fan 61, and is cooled only by a flow of the cooling air generated in the outlet side of the sirocco fan 61. However, as is the present configuration, the difference in level is provided in the heat sink 43, and the sirocco fan 61 is disposed so that two ports thereof, the first inlet port 71 and the outlet port 73, are arranged so as to face the first stage portion 62 and the second stage portion 63 of the heat sink 43 respectively. Thereby cooling of the heat sink 43 becomes possible by using not only the flow of the cooling air generated in the outlet side of the sirocco fan 61 but also the flow of the cooling air generated in the inlet side. This enables a single fan to redundantly cool the heat sink 43, thus improving the cooling efficiency.

In the configuration, a part of the heat sink 43 is cut out to provide the difference in level and the sirocco fan 61 is disposed in the difference portion, which also enables space saving of the cooling structure. The present configuration uses the sirocco fan 61 having the outlet port 73 whose wide-width, i.e., its horizontal width is wider than its thickness, and it is because the cooling efficiency is to be further enhanced. The sirocco fan 61 with the wider outlet port 73 enables an increase in an area from which the cooling air is exhausted and an increase in a contact area between the cooling air and the heat sink 43. By increasing the contact area between the cooling air and the heat sink 43, the cooling efficiency can be improved.

In the case of the wide sirocco fan 61, the thickness of the fan itself can also be made thin. This allows not only enhancement of the cooling efficiency but also contribution to the space saving. Even in an ordinary sirocco fan 61 with a square outlet port 73, the configuration can be implemented.

Second Embodiment

Figure 11:
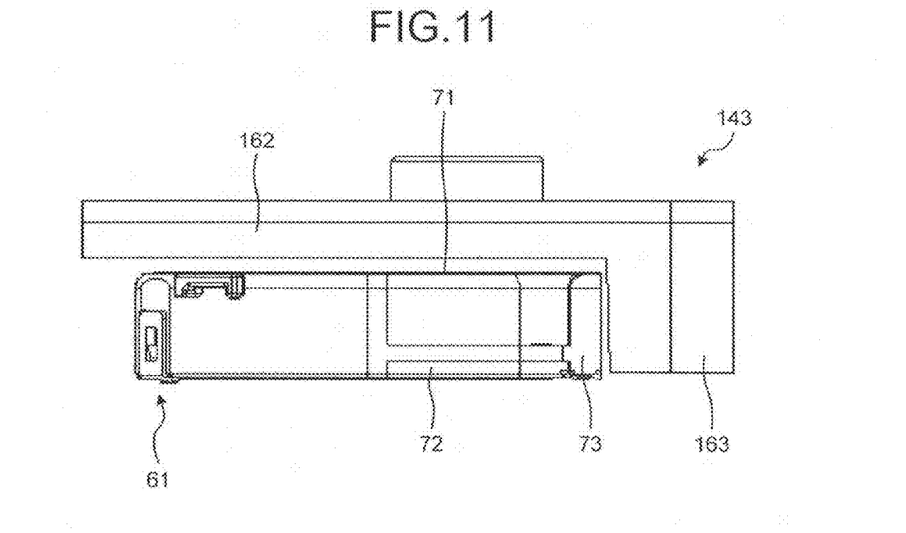
FIG. 11 is a side view illustrating a heat sink according to a second embodiment of the present invention.
Figure 12:
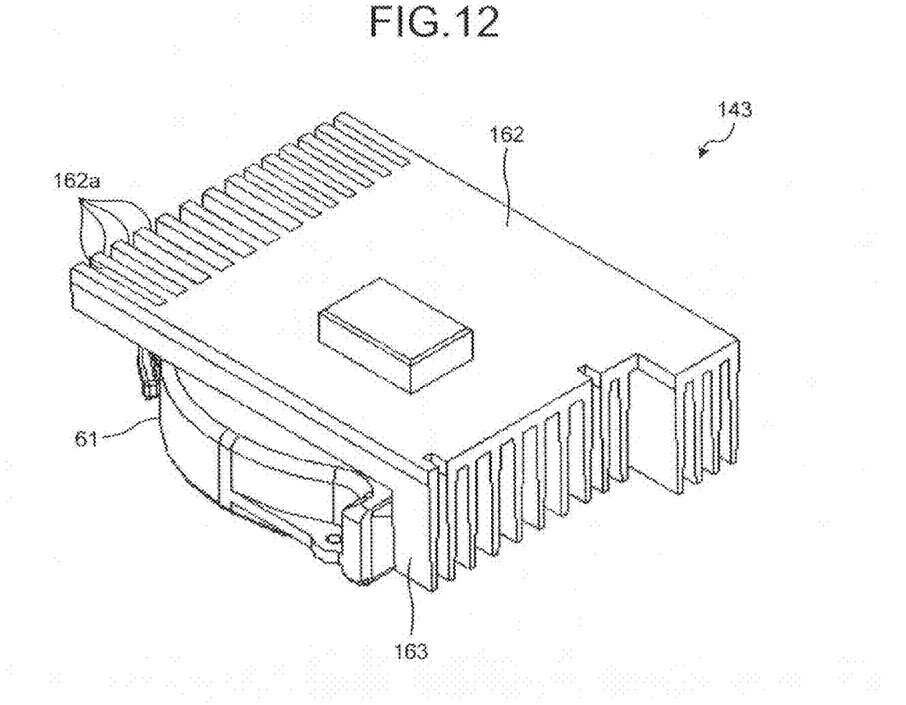
FIG. 12 is a perspective view illustrating the heat sink according to the second embodiment.

A second embodiment of the present invention will be explained next. FIG. 11 is a side view of the heat sink, and FIG. 12 is a perspective view of the heat sink. In the second embodiment, a shape of a heat sink 143 is different from that in the first embodiment, and a first stage portion 162 is extended up to a position where it covers the whole area of the top surface of the sirocco fan 61. Therefore, the whole of the first inlet port 71 of the sirocco fan 61 faces the first stage portion 162 of the heat sink 143, and the outlet port 73 of the sirocco fan 61 faces a second stage portion 163 of the heat sink 143.

In the case of the present configuration, because the surface area of the first stage portion 162 of the heat sink 143 increases, a contact area with the cooling air in the air inlet side also inevitably increases. As a result, the cooling capacity in the air inlet side is increased. On the other hand, the first inlet port 71 of the sirocco fan 61 is fully covered by the first stage portion 162 of the heat sink 143, and it is therefore expected that ventilation resistance increases. Because of this, an intake air amount of the air taken in from the first inlet port 71 decreases, and, as a result, an exhaust air amount of the air exhausted from the outlet port 73 may also decrease. In other words, the capacity of cooling the second stage portion 163 of the heat sink 143 may possibly be decreased. Therefore, if the length of the first stage portion 162 of the heat sink 143 is made long, some ideas of how to keep the intake air amount high are required.

Therefore, as illustrated in FIG. 12, each space 162a is provided between the fins for heat dissipation in an area, of the first stage portion 162 of the heat sink 143, facing the first inlet port 71, and a path for air intake through which cooling air passes is provided, which thereby enables prevention of an increase in the ventilation resistance in the air inlet side. As a result, even in the present configuration in which the whole of the first inlet port 71 of the sirocco fan 61 faces the first stage of the heat sink 143, the cooling efficiency can be enhanced without decreasing the inlet/exhaust air amount.

As explained above, in the configuration according to the embodiment, the flow of the air generated in the air inlet side of the sirocco fan 61 can also be used for cooling the heat sink being the heat dissipation plate. With the configuration, the amount of air generated by the sirocco fan 61 can be increased without upsizing the sirocco fan 61. As a result, the cooling capacity can be increased also in any fan of the same size.

The ordinary configuration is such that the fins of the heat dissipation plate are attached to the air outlet face side of the sirocco fan 61; however, when the air generated in the air intake face side of the sirocco fan 61 is also used for cooling as is the present configuration, the fins of the heat sink need to be provided in a position facing the air intake face. Therefore, it is preferable to set the shape of the heat dissipation plate as one in which a difference in level like an L-shape is provided and to store the sirocco fan in a portion of the difference of the L-shape. This configuration allows the heat dissipation plate to be provided so as to face both of the air intake face and the air exhaust face of the sirocco fan, and allows both of the intake air and exhaust air to be used for cooling, thus enhancing the cooling efficiency.

The cooling device can be provided in electronic apparatuses and the like with, for example, a processor and an arithmetic circuit as apparatuses targeted for cooling, besides the image projection apparatus. Moreover, any contact type member other than the heat sink may be used as the heat dissipation plate.

According to the present invention, the object to be cooled can be efficiently cooled while achieving the downsizing.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A cooling device, comprising:
a heat dissipator that is in direct contact with an object to be cooled and to dissipate heat; and
an air blower that takes therein air and blows the air to the heat dissipator,
wherein the heat dissipator includes:
a first stage portion, and
a second stage portion having a level different from a level of the first stage portion,
wherein:
the air blower includes:
a first inlet port that takes therein air from outside; and
an outlet port that exhausts the taken-in air,
the first inlet port faces the first stage portion, and the outlet port faces the second stage portion,
the first stage portion includes a bottom surface having a plurality of fins with spaces disposed between the fins,
the spaces face the first inlet port,
cooling air from the outside passes through the spaces to the first inlet port,
the heat dissipator includes a solid surface at a position where the heat dissipator is in direct contact with the object to be cooled, and
the air blower further includes a second inlet port on an opposite face side to the first inlet port.

2. The cooling device according to claim 1, wherein the second inlet port is disposed at a position facing an air intake port of a housing in which the cooling device is stored.

3. The cooling device according to claim 1, wherein,
a bottom area of the second stage portion is smaller than a bottom area of the first stage portion, and
the air blower is disposed in a region where the levels of the first and second stage portions are different.

4. The cooling device according to claim 1, wherein,
the first stage portion of the heat dissipator faces a whole of the first inlet port.

5. An image projection apparatus including an image processor, and a cooling device that cools the image processor, wherein the cooling device includes:
a heat dissipator that is in direct contact with an object to be cooled and to dissipate heat; and
an air blower that takes therein air and blows the air to the heat dissipator,
wherein the heat dissipator includes:
a first stage portion, and
a second stage portion having a level different from a level of the first stage portion,
wherein:
the air blower includes:
a first inlet port that takes therein air from outside; and
an outlet port that exhausts the taken-in air,
the first inlet port faces the first stage portion, and the outlet port faces the second stage portion,
the first stage portion includes a bottom surface having a plurality of fins with spaces disposed between the fins,
the spaces face the first inlet port,
cooling air from the outside passes through the spaces to the first inlet port, and
the heat dissipator includes a solid surface at a position where the heat dissipator is in direct contact with the object to be cooled, and
the air blower further includes a second inlet port on an opposite face side to the first inlet port.

6. An electronic apparatus including a device as an object to be cooled, and a cooling device that cools the device, wherein the cooling device includes:
a heat dissipator that is in direct contact with an object to be cooled and to dissipate heat; and
an air blower that takes therein air and blows the air to the heat dissipator,
wherein the heat dissipator includes:
a first stage portion, and
a second stage portion having a level different from a level of the first stage portion,
wherein:
the air blower includes:
a first inlet port that takes therein air from outside; and
an outlet port that exhausts the taken-in air,
the first inlet port faces the first stage portion, and the outlet port faces the second stage portion,
the first stage portion includes a bottom surface having a plurality of fins with spaces disposed between the fins,
the spaces face the first inlet port, cooling air from the outside passes through the spaces to the first inlet port, and the heat dissipator includes a solid surface at a position where the heat dissipator is in direct contact with the object to be cooled, and the air blower further includes a second inlet port on an opposite face side to the first inlet port.

\* \* \* \* \*